United States Patent
Yokoyama et al.

(10) Patent No.: US 11,919,511 B2
(45) Date of Patent: Mar. 5, 2024

(54) DRIVING SUPPORT CONTROL DEVICE FOR VEHICLE, DRIVING SUPPORT SYSTEM, AND DRIVING SUPPORT METHOD

(71) Applicant: DENSO CORPORATION, Kariya (JP)

(72) Inventors: Takahisa Yokoyama, Kariya (JP); Noriyuki Ido, Kariya (JP)

(73) Assignee: DENSO CORPORATION, Kariya (JP)

( * ) Notice: Subject to any disclaimer, the term of this patent is extended or adjusted under 35 U.S.C. 154(b) by 349 days.

(21) Appl. No.: 17/478,728

(22) Filed: Sep. 17, 2021

(65) Prior Publication Data
US 2022/0017081 A1 Jan. 20, 2022

Related U.S. Application Data

(63) Continuation of application No. PCT/JP2020/004837, filed on Feb. 7, 2020.

(30) Foreign Application Priority Data

Mar. 19, 2019 (JP) .................... 2019-050764

(51) Int. Cl.
G06T 7/246 (2017.01)
B60W 10/04 (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ...... B60W 30/09; B60W 10/04; B60W 10/18; B60W 10/20; B60W 50/14;
(Continued)

(56) References Cited

U.S. PATENT DOCUMENTS

2006/0056702 A1 3/2006 Tsunashima
2013/0093614 A1* 4/2013 Tokoro .................. G01S 13/931
342/109
(Continued)

FOREIGN PATENT DOCUMENTS

DE 102016210056 A1 12/2017
JP 2006-107457 A 4/2006
(Continued)

*Primary Examiner* — Stephen P Coleman
(74) *Attorney, Agent, or Firm* — MASCHOFF BRENNAN

(57) ABSTRACT

A driving support control device for a vehicle includes an acquisition unit configured to acquire, from a first detector which detects change of a brightness value of an object which occurs in accordance with displacement of the object, information indicating change of a brightness value of a partially shielded object partially shielded by an obstacle which occurs in accordance with displacement of the partially shielded object, as a first detection signal, and a control unit configured to, in a case where it is determined, by using the first detection signal, that the partially shielded object is moving, cause a driving support execution device to execute collision prevention support for preventing a collision with the partially shielded object.

13 Claims, 6 Drawing Sheets

(51) Int. Cl.
| | |
|---|---|
| *B60W 10/18* | (2012.01) |
| *B60W 10/20* | (2006.01) |
| *B60W 30/09* | (2012.01) |
| *B60W 50/14* | (2020.01) |
| *G06F 18/23* | (2023.01) |
| *G06V 10/60* | (2022.01) |
| *G06V 20/58* | (2022.01) |

(52) U.S. Cl.
CPC .............. *B60W 50/14* (2013.01); *G06F 18/23* (2023.01); *G06T 7/246* (2017.01); *G06V 10/60* (2022.01); *G06V 20/58* (2022.01); *B60W 2554/404* (2020.02); *B60W 2710/18* (2013.01); *B60W 2710/20* (2013.01); *B60W 2720/106* (2013.01); *B60W 2720/125* (2013.01); *G06T 2207/30261* (2013.01)

(58) Field of Classification Search
CPC ....... B60W 2554/404; B60W 2710/18; B60W 2710/20; B60W 2720/106; B60W 2720/125; B60W 2554/402; B60W 2554/4029; B60W 30/0953; B60W 30/0956; G06F 18/23; G06T 7/246; G06T 2207/30261; G06T 7/254; G06V 10/60; G06V 20/58; G06V 10/273; G08G 1/16
USPC ......................................................... 382/104
See application file for complete search history.

(56) References Cited

U.S. PATENT DOCUMENTS

| | | | |
|---|---|---|---|
| 2017/0066449 | A1* | 3/2017 | Lee ....................... B60G 17/019 |
| 2018/0357772 | A1 | 12/2018 | Takemura et al. |

FOREIGN PATENT DOCUMENTS

| | | |
|---|---|---|
| JP | 2015-162165 A | 9/2015 |
| JP | 2017-151535 A | 8/2017 |
| JP | 2017-182139 A | 10/2017 |

* cited by examiner

DRIVING SUPPORT CONTROL DEVICE FOR VEHICLE, DRIVING SUPPORT SYSTEM, AND DRIVING SUPPORT METHOD

CROSS-REFERENCE TO RELATED APPLICATION

The present application is based on and claims the benefit of priority from earlier Japanese Patent Application No. 2019-50764 filed on Mar. 19, 2019, the description of which is incorporated herein by reference.

BACKGROUND

Technical Field

The present disclosure relates to a technique of driving support for a vehicle.

Related Art

A technique of determining existence of a moving object in a blind area formed by an obstacle is proposed in a technique of detecting an object around a vehicle by using a target detector such as an image pickup device and a radar.

SUMMARY

An aspect of the present disclosure provides a driving support control device for a vehicle. The device includes: an acquisition unit configured to acquire, from a first detector which detects change of a brightness value of an object which occurs in accordance with displacement of the object, information indicating change of a brightness value of a partially shielded object partially shielded by an obstacle which occurs in accordance with displacement of the partially shielded object, as a first detection signal; and a control unit configured to, in a case where it is determined, by using the first detection signal, that the partially shielded object is moving, cause a driving support execution device to execute collision prevention support for preventing a collision with the partially shielded object.

DETAILED DESCRIPTION OF THE PREFERRED EMBODIMENTS

A technique of determining existence of a moving object in a blind area formed by an obstacle has been proposed in a technique of detecting an object around a vehicle by using a target detector such as an image pickup device and a radar (see, for example, JP 2017-182139 A).

However, avoiding a collision with a moving object by utilizing a determination result of existence of the moving object in a blind area has not been studied.

It is therefore desired to reduce collision or prevent a collision with a partially shielded object which is partially shielded by an obstacle and which is moving.

A driving support control device for a vehicle, a driving support system, and a driving support method according to the present disclosure will be described below on the basis of some embodiments.

First Embodiment

Figure 1:
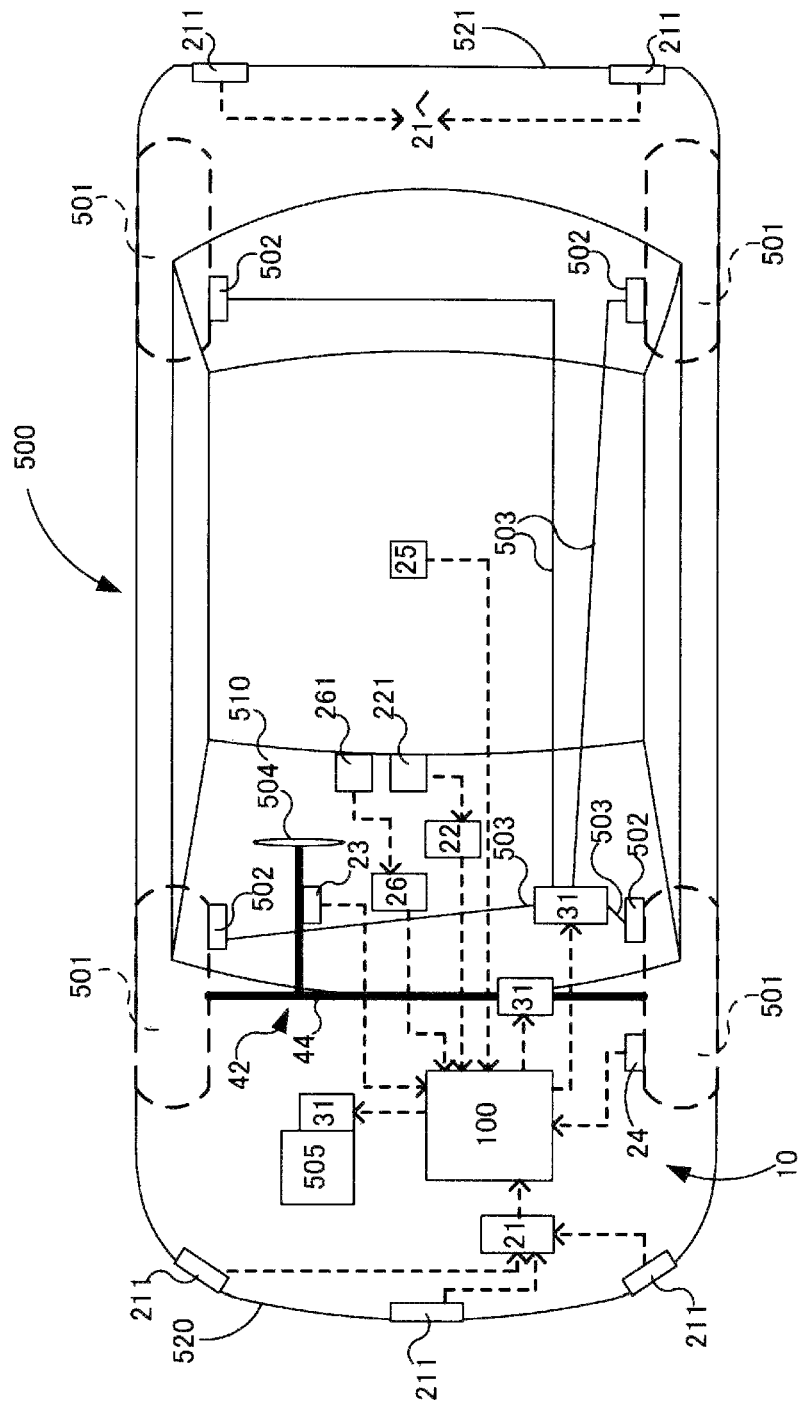
FIG. 1 is an explanatory diagram illustrating an example of a vehicle to which a driving support control device according to a first embodiment is mounted.

As illustrated in FIG. 1, a driving support control device 100 for a vehicle according to a first embodiment is used in a state where the driving support control device 100 is mounted to a vehicle 500. The driving support control device 100 is only required to include at least a control unit and an acquisition unit, and a driving support system 10 includes a radar ECU 21, a millimeter wave radar 211, a camera ECU 22, a camera 221, an event camera ECU 26, and an event camera 261 as detectors, and a driving support execution device 31 in addition to the driving support control device 100. Note that it is only necessary that at least one of a set of the radar ECU 21 and the millimeter wave radar 211 and a set of the camera ECU 22 and the camera 221 is provided. The vehicle 500 in the first embodiment further includes a rotational angle sensor 23, a wheel speed sensor 24, and a yaw rate sensor 25. The vehicle 500 further includes wheels 501, braking devices 502, a braking line 503, a steering wheel 504, a windshield 510, a front bumper 520, and a rear bumper 521. The vehicle 500 includes at least one of an internal-combustion engine or an electric motor as a drive source 505 for vehicle traveling.

The radar ECU 21 is connected to the millimeter wave radar 211 which emits radio waves and detects reflected waves from a target and generates and outputs a second detection signal representing the target with detection points, that is, reflection points by using the reflected waves acquired by the millimeter wave radar 211. The camera ECU 22 is connected to a monocular camera 221, specifies a shape of a target from a captured image acquired by the camera 221, and generates and outputs a second detection signal indicating a type of the object determined through pattern matching processing using a shape pattern of an object prepared in advance. The shape of the target is specified through, for example, semantic segmentation using machine learning. For example, pixel value information (R, G and B) and coordinate information as position information are associated with pixels included in each frame of the captured image. The radar ECU 21 and the millimeter wave radar 211, and the camera ECU 22 and the camera 221 correspond to a second detector which acquires information regarding an object around an own vehicle and outputs the information as the second detection signal.

The event camera ECU 26, which is connected to the event camera 261 which can acquire change of brightness values of an object in association with displacement of the object in unit of several microseconds, generates information regarding changed pixels for which change of the brightness values in accordance with displacement of the object is equal to or more than a threshold determined in advance, and outputs the information as the first detection signal. The event camera ECU 26 and the event camera 261 correspond to a first detector which acquires information regarding the changed pixels for which values are changed in accordance with displacement of the object and outputs the information as the first detection signal.

Each of the ECUs 21, 22 and 26 is a microprocessor including a computation unit, a storage unit, and an input/output unit. Note that the radar ECU 21 and the millimeter wave radar 211 correspond to a detector for typically measuring a distance between the own vehicle and a target by emitting detection waves and detecting reflected waves and reflection points and detect a distance, relative speed and an angle of the target with respect to the vehicle 500. As this detector, a laser radar (LIDAR) or an ultrasonic detector which emits sound waves and detects reflected waves of the sound waves may be used as well as the millimeter wave radar 211. The camera ECU 22 and the camera 221, which are detectors which can recognize a shape of the target in a three-dimensional manner, correspond to an image pickup device. A 3D lidar may be used as well as the camera 221 as the image pickup device. The camera 221 may be a stereo camera or a multi-camera constituted with two or more cameras. As the event camera 261, an image pickup device, which can output a detection signal including frames at a high frame rate, for example, at 1000 fps at which a stationary object can be distinguished from a moving object, that is, displacement of a partially shielded object which is partially shielded by an obstacle can be identified, may be used as well as an image sensor which does not output a detection signal including frames.

The vehicle 500 includes the braking devices 502 for implementing braking of the vehicle 500, and the steering wheel 504 for implementing steering of the vehicle 500. The braking devices 502 are provided at the respective wheels 501. Each braking device 502 is, for example, a disk brake or a drum brake, and implements braking of the vehicle 500 by braking each wheel 501 with braking force in accordance with a brake fluid pressure supplied via the braking line 503 in accordance with brake pedal operation by a driver. The braking line 503 includes a brake piston which generates a brake fluid pressure in accordance with the brake pedal operation and a brake fluid line. Note that it is also possible to employ a configuration where actuators provided to the respective braking devices 502 are activated using a control signal line in place of the brake fluid line as the braking line 503. The steering wheel 504 is connected to the wheels 501 on a front side via a steering device 42 including a steering rod, a steering mechanism and a steering shaft 44.

Figure 2:
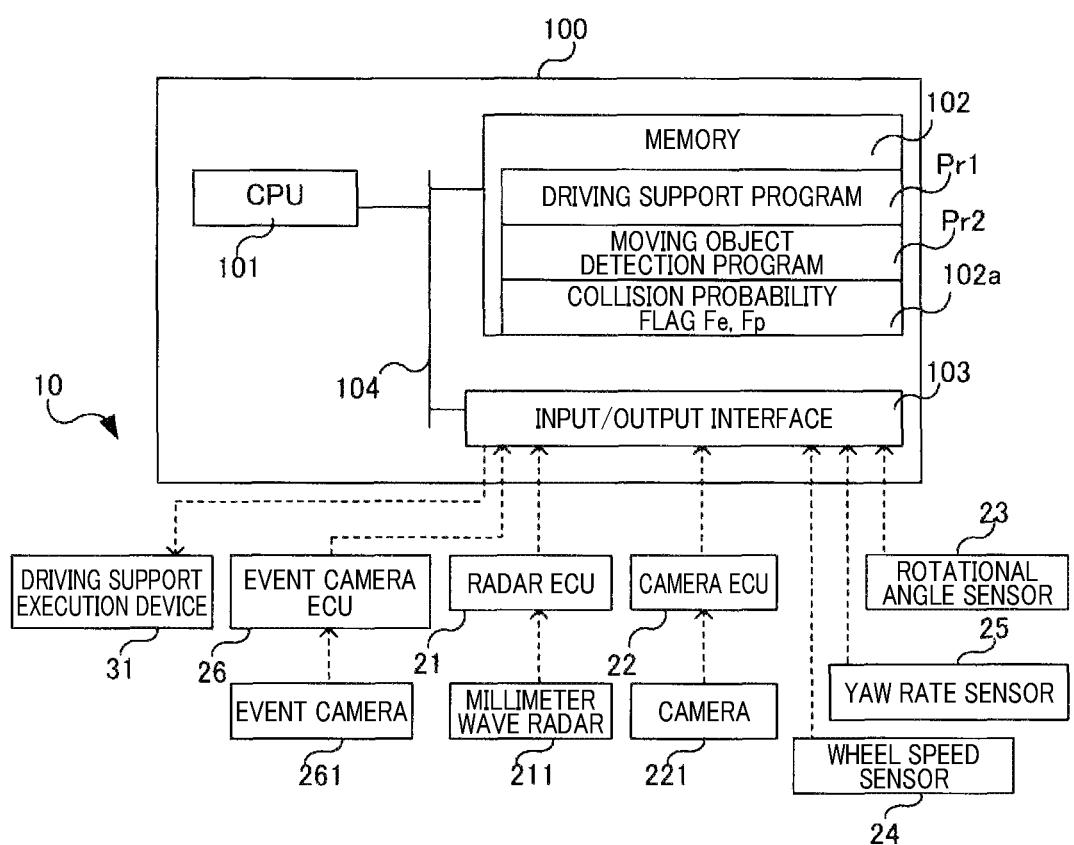
FIG. 2 is a block diagram illustrating a functional configuration of the driving support control device according to the first embodiment.

As illustrated in FIG. 2, the driving support control device 100 includes a central processing unit (CPU) 101 as a control unit, and a memory 102, an input/output interface 103 as an acquisition unit, and a bus 104. The CPU 101, the memory 102, and the input/output interface 103 are connected via the bus 104 so as to be able to perform bidirectional communication. The memory 102 includes a memory, for example, a ROM which stores a driving support program Pr1 for executing driving support of the own vehicle, and a moving object detection program Pr2 for detecting a moving object by using a detection result of the event camera 261 in a non-volatile manner and in a read-only manner, and a memory, for example, a RAM which allows reading and writing by the CPU 101 and which has a collision probability flag storage area 102a. The CPU 101 implements functions as a control unit by loading the driving support program Pr1 and the moving object detection program Pr2 stored in the memory 102 to a read-write memory and executing the programs. Note that the CPU 101 may be a single CPU or a plurality of CPUs which execute the respective programs, or may be a multicore type CPU which can execute a plurality of programs at the same time.

The radar ECU 21, the camera ECU 22, the event camera ECU 26, the rotational angle sensor 23, the wheel speed sensor 24, the yaw rate sensor 25 and the driving support execution device 31 are connected to the input/output interface 103 via a control signal line. Detection signals are input from the radar ECU 21, the camera ECU 22, the event camera ECU 26, the rotational angle sensor 23, the wheel speed sensor 24, and the yaw rate sensor 25. A control signal which gives an instruction of driving force in accordance with requested torque, a control signal which gives an instruction of a braking level, and a control signal which gives an instruction of a steering angle are output to the driving support execution device 31. Thus, the input/output interface 103 functions as an acquisition unit for acquiring detection signals detected by various kinds of sensors, including the first detection signal and the second detection signal.

The millimeter wave radar 211 is a sensor which emits millimeter waves and receives reflected waves reflected by a target. In the present embodiment, the millimeter wave radars 211 are disposed at the front bumper 520 and the rear bumper 521. An unprocessed detection signal output from the millimeter wave radar 211 is processed at the radar ECU 21 and input to the driving support control device 100 as a detection signal including a detection point or a detection point sequence indicating one or a plurality of representative positions of the target. Alternatively, a signal indicating an unprocessed received wave may be input to the driving support control device 100 from the millimeter-wave radar 211 as the detection signal without the radar ECU 21 being provided. In a case where an unprocessed received wave is used as the detection signal, the driving support control device 100 executes signal processing for specifying a position and a distance of the target.

The camera 221, which is an image pickup device including one image pickup element such as a CCD or one image pickup element array, is a sensor which outputs contour information or shape information of an object as image data which is a detection result by receiving visible light. The image data captured by the camera 221 is subjected to the above-described processing by the camera ECU 22, and the second detection signal indicating a type of the object is generated. Unprocessed image data captured by the camera 221 may be input to the driving support control device 100 as the second detection signal. In this case, segmentation processing of the target and processing of determining a type are executed at the driving support control device 100. In the present embodiment, the camera 221 is disposed at the center of an upper part of the windshield 510. The image data output from the camera 221 may be black and white image data. In this case, brightness values are used for segmentation.

The event camera 261 is an image pickup device of an event detection type which includes a plurality of pixels constituted with a signal image pickup element and which can detect an event of change of brightness values of an object which occurs in association with displacement of the object in unit of several microseconds. The event camera 261 outputs information, for example, received light intensity and coordinates of pixels regarding changed pixels corresponding to positions at which the brightness values are changed in the object as a detection result instead of outputting a detection result in frame unit obtained by scanning all of the plurality of pixels. Thus, use of a detection result of the event camera 261 enables a stationary object to be distinguished from a moving object within an imaging view angle, that is, enables extraction of a moving object in association with displacement, so that it is possible to detect displacement of a partially shielded object which is partially shielded by an obstacle. In the present embodiment, the event camera ECU 26 generates information including coordinates of positions and brightness values regarding the changed pixels for which change of the detected brightness values is equal to or greater than a threshold determined in advance, that is, information indicating displacement of a partially shielded object which is partially shielded by an obstacle and outputs the information as the first detection signal. The event camera 261 is only required to output information regarding the changed pixels for which values are changed in accordance with the displacement of the object, and an image pickup device, which can output a detection signal including frames at a high frame rate, for example, at 1000 fps at which a stationary object can be distinguished from a moving object, that is, displacement of a partially shielded object which is partially shielded by an obstacle can be identified, may be used as well as an image sensor which does not output a detection signal including frames.

The rotational angle sensor 23, which is a torque sensor which detects an amount of twist occurring at the steering rod by steering of the steering wheel 504, that is, steering torque as a voltage value proportional to the amount of twist, detects a steering angle of the steering wheel 504. In the present embodiment, the rotational angle sensor 23 is provided to the steering rod which connects the steering wheel 504 and the steering mechanism.

The wheel speed sensor 24, which is a sensor detecting rotational speed of the wheel 501, is provided to each wheel 501. A detection signal output from the wheel speed sensor 24 is a voltage value proportional to wheel speed or a pulse wave indicating an interval in accordance with wheel speed. Information such as vehicle speed and a travel distance of the vehicle can be obtained by using the detection signal from the wheel speed sensor 24.

The yaw rate sensor 25 is a sensor which detects rotational angular velocity of the vehicle 500. The yaw rate sensor 25 is, for example, disposed at a central part of the vehicle. A detection signal output from the yaw rate sensor 25 is a voltage value proportional to a rotational direction and an angular velocity.

The driving support execution device 31 controls increase and decrease of power of the drive source 505 in accordance with accelerator pedal operation by the driver or regardless of the accelerator pedal operation by the driver, implements braking by the braking devices 502 regardless of brake pedal operation by the driver or implements steering by the steering device 42 regardless of operation of the steering wheel 504 by the driver.

Figure 3:
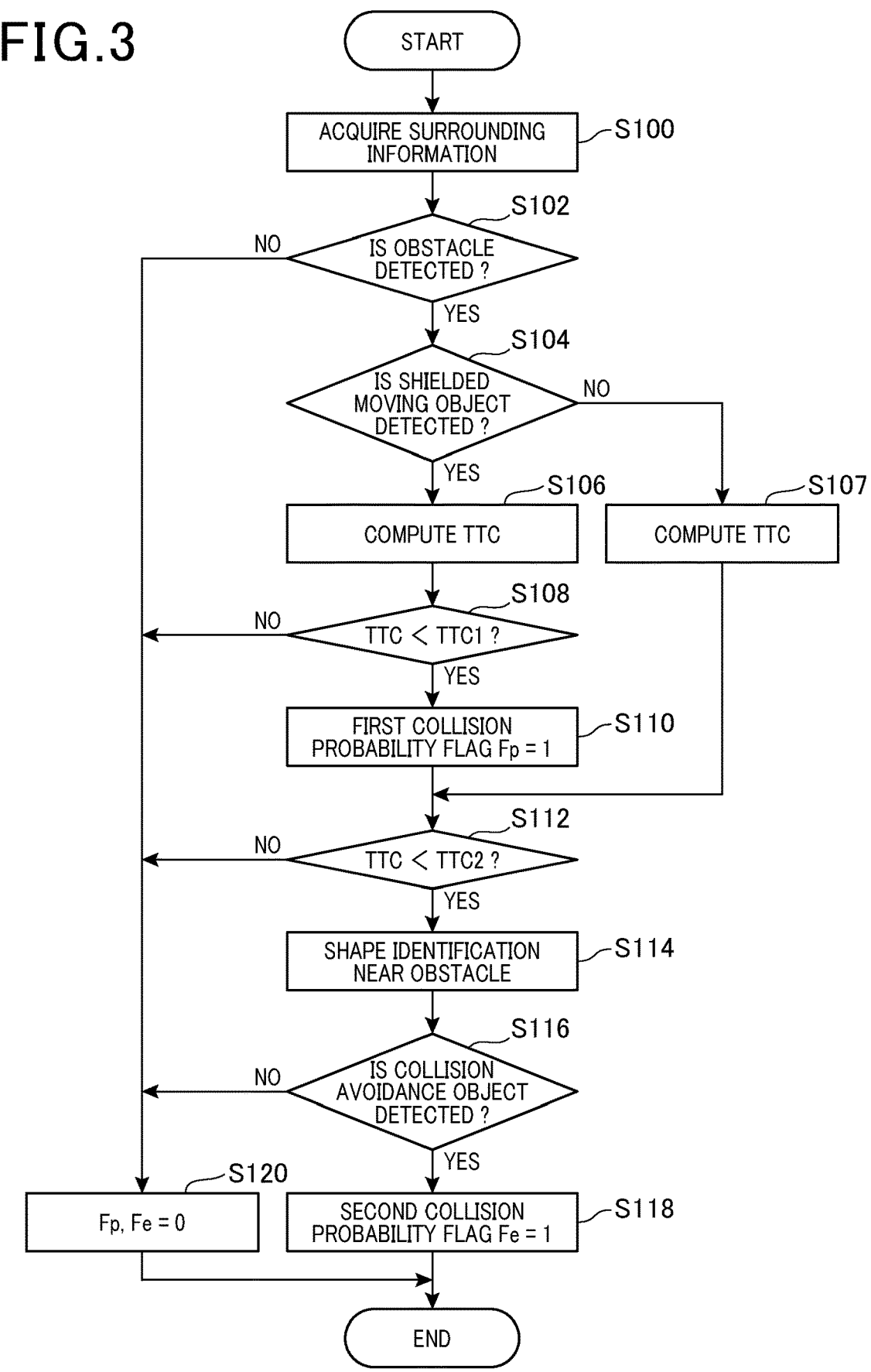
FIG. 3 is a flowchart illustrating a processing flow of driving support processing to be executed by the driving support control device according to the first embodiment.
Figure 5:
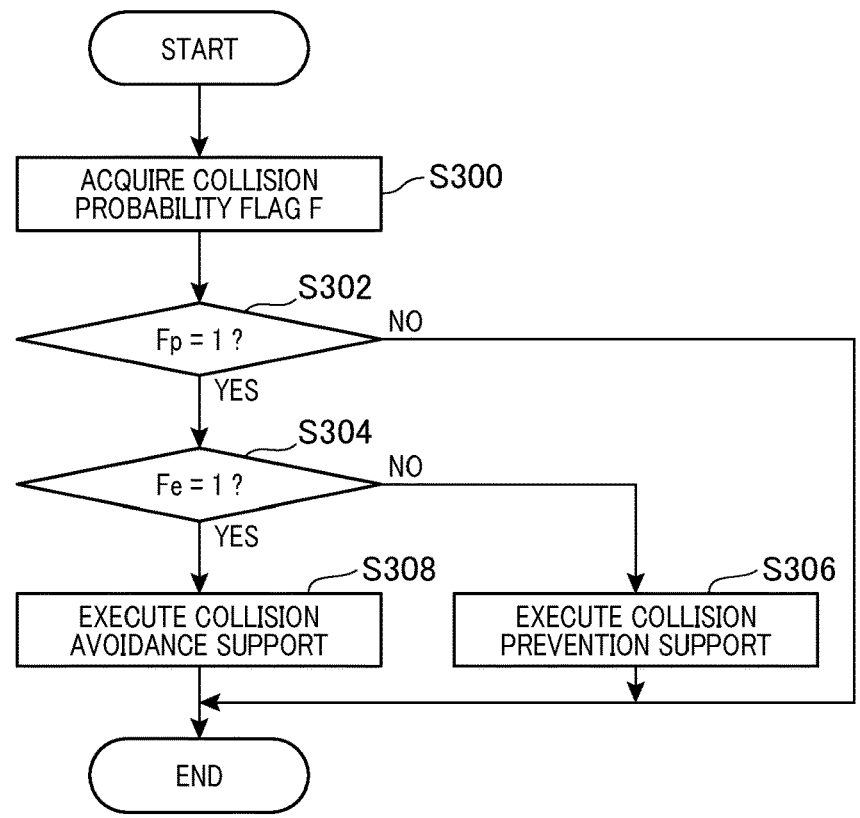
FIG. 5 is a flowchart illustrating a processing flow of the driving support processing to be executed by the driving support control device according to the first embodiment.

Driving support processing to be executed by the driving support control device 100 according to the first embodiment will be described. Processing routine illustrated in FIG. 3 and FIG. 5 is repeatedly executed at predetermined time intervals, for example, at intervals of several milliseconds from when, for example, a control system of the vehicle is started until when the control system is stopped, or from when a start switch is turned on until when the start switch is turned off. The driving support processing illustrated in FIG. 3 and FIG. 5 is executed by the CPU 101 executing the driving support program Pr1. Note that the driving support processing illustrated in FIG. 3 can be regarded as first driving support processing of determining whether driving support processing is required and setting driving support processing which should be executed, and the driving support processing illustrated in FIG. 5 can be regarded as second driving support processing of executing driving support in accordance with the set driving support processing.

Figure 6:
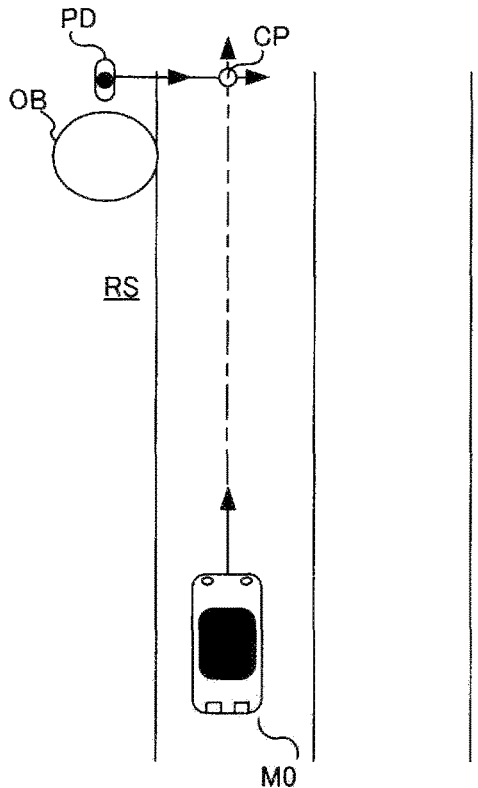
FIG. 6 is an explanatory diagram schematically illustrating positional relationships among an own vehicle, an obstacle, and a moving object which is shielded by the obstacle on a road.

The CPU 101 acquires surrounding information, that is, the second detection signal via the input/output interface 103 (step S100). The surrounding information includes, for example, information regarding a type of an object around the own vehicle extracted from an image captured by the camera 221 and information regarding a distance and a relative speed of the object detected by the millimeter wave radar 211. The CPU 101 determines whether an obstacle is detected, that is, whether an obstacle exists on a scheduled course of the own vehicle and near the scheduled course by using the acquired surrounding information (step S102). The CPU 101, for example, determines that an obstacle exists in a case where reflection points of the millimeter wave radar 211 exist on the scheduled course of the own vehicle and near the scheduled course and determines that an obstacle exists in a case where a target corresponding to the obstacle is detected in the image captured by the camera 221. At the same time, the CPU 101 acquires a distance between the own vehicle and the obstacle, a relative speed and a position of the obstacle. Examples of the obstacle include an installation on a road, for example, a roadside tree OB planted on a roadside RS illustrated in FIG. 6 and FIG. 7, an advertising sign, a sign, a construction barrier, a parking vehicle, and a building having a transparent portion such as glass. The driving support processing of the present embodiment is aimed at an obstacle from which existence of a moving object can be confirmed as an appropriate target, the moving object being an object which is located behind the obstacle, partially shielded by the obstacle and cannot be partially recognized from the vehicle. In a case where an image of a situation illustrated in FIG. 6 is captured with the second detector, for example, the camera 221 from the own vehicle M0, an image pickup result schematically illustrated in FIG. 7 can be obtained. In the example in FIG. 7, a pedestrian PD as a moving object is moving behind a tree as the obstacle OB, that is, moving in a state where the pedestrian PD is shielded by the tree. The pedestrian PD moves over time from a first position Po2 at which the pedestrian PD is shielded by the obstacle OB to a second position Po2 at which a large portion of the pedestrian PD is exposed from the obstacle OB as a non-shielded object, and to a third position Po3 at which the pedestrian PD entirely appears from the obstacle OB as a non-shielded object. An object which can be detected by the second detector is a non-shielded object which is not shielded by the obstacle OB and is the pedestrian PD at the second position Po2 or the third position Po3 at which at least part of the pedestrian PD is exposed from the obstacle OB.

In a case where an obstacle is detected (step S102: Yes), the CPU 101 determines whether movement of a partially shielded object which is partially shielded by the obstacle is detected (step S104). The CPU 101 executes moving object detection processing using a detection result by the event camera 261 which will be described later parallel to the driving support processing and detects whether the partially shielded object is moving by using moving object information obtained through the moving object detection processing and obstacle information detected in the present processing routine. Specifically, a detection result of the obstacle and a detection result of the moving object are fused through fusion processing, and whether the partially shielded object is moving is determined in accordance with whether a detection position of the obstacle overlaps with a detection position of the moving object. The fusion processing may be executed by a local coordinate system of the vehicle or may be executed by converting a position coordinate of the obstacle and a position coordinate of the moving object into coordinates in a traveling environment, for example, a global coordinate system of the road to further improve accuracy. In a case where an obstacle is not detected (step S102: No), the processing of the CPU 101 proceeds to step S120. In a case where no obstacle is detected, an object for which driving support is to be performed can be recognized by the millimeter wave radar 211 or the camera 221, so that appropriate driving support can be executed without determination of a shielded moving object which is moving in a state where the object is shielded by an obstacle being executed.

Figure 7:
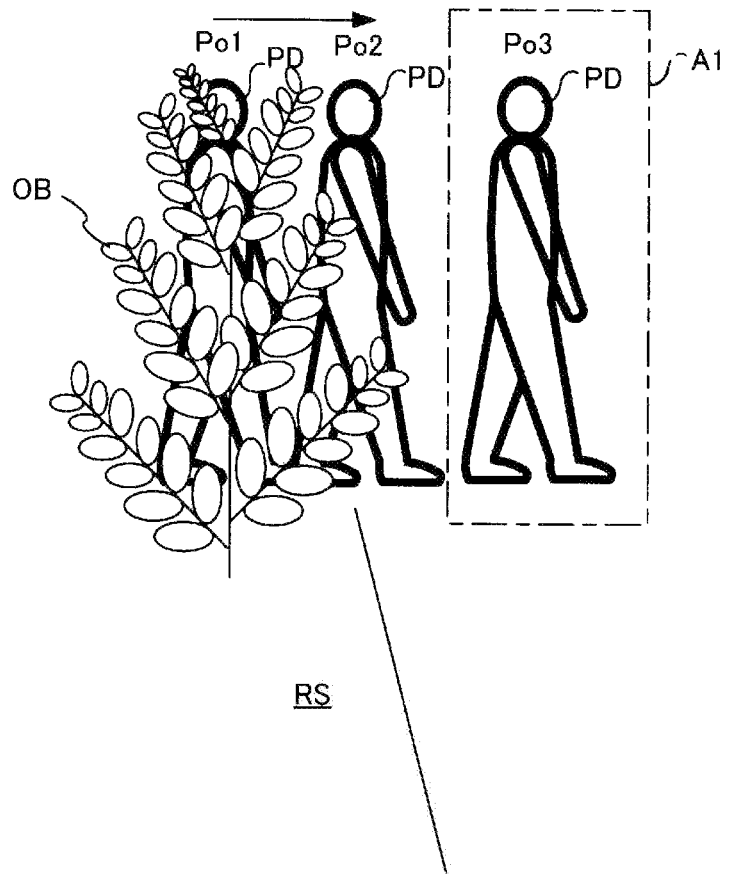
FIG. 7 is an explanatory diagram schematically illustrating a detection result of an obstacle and a moving object shielded by the obstacle, detected by a detector.

In a case where the pedestrian PD is located at the first position Po1 or the second position Po2 in FIG. 7, the detection position of the obstacle overlaps with the detection position of the moving object, and thus, the CPU 101 detects whether there is a partially shielded object which is partially shielded by an obstacle and which is moving (step S104: Yes) and calculates time to collision (TTC) of the own vehicle M0 with respect to a collision avoidance target (step S106). The moving partially shielded object, that is, the shielded moving object includes a moving object which is likely to appear on a road, for example, a human, a bicycle and a vehicle. The TTC is calculated through TTC=distance between an operation target and the own vehicle/(speed of the operation target–speed of the own vehicle) which is a publicly known arithmetic expression. The operation target is the obstacle OB or the shielded moving object PD, and the distance between the shielded moving object PD and the own vehicle may be calculated, for example, using the position coordinate of the moving object included in the obtained moving object information on the basis of a distance from the own vehicle M0 to the obstacle OB in a case where an information amount of changed pixels included in the moving object information is small and can constitute less than 30% of an outline contour of an object target for which collision avoidance support should be executed, or may be calculated using the position coordinate of the moving object in a case where an information amount of changed pixels included in the moving object information is large and can constitute equal to or more than 70% of the outline contour of the object target. In a case where the detection position of the obstacle OB does not overlap with the detection position of the moving object, the CPU 101 determines that the shielded moving object PD is not detected (step S104: No) and calculates TTC while setting the obstacle OB as the operation target (step S107), and the processing proceeds to step S112. In other words, normal driving support processing is performed on the obstacle OB which can be recognized from the own vehicle M0 without setting the shielded moving object PD as an operation target. Note that in a case where normal driving support processing is executed through another processing flow, the processing may proceed to step S112 without the processing in step S107 being executed.

The CPU 101 determines whether TTC is less than first determination TTC1, that is, TTC<TTC1 (step S108). The first determination TTC1 is a determination period for determining start of execution of collision prevention support which improves a probability of collision avoidance at a position of the obstacle OB, that is, prevents a collision with a shielded moving object PD which is likely to appear from a blind area of the obstacle OB, and is, for example, three seconds. As will be described later, a probability of collision avoidance is improved, that is, a collision is prevented by, for example, arbitrarily combining preliminary application of a pressure to the braking line 503 or light braking through braking support, notification which calls attention to the driver, steering support which encourages preliminary change of a traveling lane to a traveling lane which is further from the obstacle and preliminary acceleration limit which disables or restricts accelerator pedal operation. In a case where it is determined that TTC<TTC1 (step S108: Yes), the CPU 101 turns on a first collision probability flag Fp, that is, sets Fp=1, and stores the first collision probability flag Fp in the collision probability flag storage area 102a of the memory 102 (step S110). The first collision probability flag Fp is a flag indicating that there is a probability of a collision with the shielded moving object PD. In a case where it is determined that TTC is not less than TTC1 (step S108: No), the processing of the CPU 101 proceeds to step S120.

The CPU 101 determines whether the TTC is less than second determination TTC2, that is, TTC<TTC2 (step S112). The second determination TTC2 is smaller than the first determination TTC1, is a determination period for determining start of execution of collision avoidance support to achieve collision avoidance at the position of the obstacle OB, that is, to achieve collision avoidance with the shielded moving object PD which is likely to appear from a blind area of the obstacle OB, and is, for example, 0.6 seconds. A support level, that is, a degree of support by the collision avoidance support is higher than a support level of collision prevention by the collision prevention support. A collision is avoided by the collision avoidance support by, for example, arbitrarily combining stopping of the own vehicle M0 or braking to extremely low speed at a collision point CP through braking support, change of a scheduled course in a direction further from the obstacle OB at the collision point CP through steering support, and acceleration limit which disables accelerator operation. In a case where it is determined that TTC<TTC2 (step S112: Yes), the CPU 101 executes shape identification processing, that is, pattern matching processing while setting an area A1 near the obstacle OB as a target area by using the second detection signal (step S114). To improve determination accuracy of a type of the shielded moving object PD which is likely to appear from a blind area of the obstacle OB, shape identification processing of an object is preferably executed while the area A1 near the obstacle OB is positioned as a focused target area. In a case where a collision avoidance object is detected as a result of the shape identification processing (step S116: Yes), the CPU 101 turns on a second collision probability flag Fe, that is, sets Fe=1, stores the second collision probability flag Fe in the collision probability flag storage area 102a of the memory 102 (step S118) and finishes the present processing routine. The collision avoidance object which can be detected using the second detection signal is a non-shielded object which is not shielded by the obstacle OB, and is, for example, the shielded moving object PD which moves to the third position Po3 at which the entire of the object becomes a non-shielded object or the second position Po2 at which part of the object becomes a non-shielded object in FIG. 7. In other words, the collision avoidance object is at least part of the shielded moving object PD which appears on the scheduled course or near the scheduled course of the own vehicle M0 from the obstacle OB and becomes a non-shielded object. Further, the collision avoidance object which can be detected using the second detection signal can include other vehicles which are being recognized and the obstacle OB itself which is an installation on a roadside such as an advertising sign as well as the shielded moving object PD. The second collision probability flag Fe is a flag indicating that the collision avoidance object is detected and it is determined to execute avoidance of a collision with the collision avoidance object. In a case where it is determined that TTC is not less than TTC2 (step S116: No), the processing of the CPU 101 proceeds to step S120. Note that in a case where it is determined in step S104 that the shielded moving object PD exists, an execution frequency of detection processing of an object using the second detection signal, that is, the processing from step S112 to step S118 may be increased. In this case, it is possible to further improve effectiveness and a probability of collision avoidance between the collision avoidance object and the vehicle. Note that the collision avoidance object may be determined using the first detection signal in place of or along with the second detection signal. In a case where the first detection signal is used, even in a case where only part of the shielded moving object PD appears, the collision avoidance object can be determined by using movement information of the shielded moving object PD which can be obtained using the first detection signal, so that it is possible to determine the collision avoidance object at an earlier timing.

The CPU 101 turns off the first collision probability flag Fp and the second collision probability flag Fe, that is, sets Fp=0 and Fe=0 in step S120 and finishes the present processing routine. The processing proceeds to step S120 as a result of determination that there is no shielded moving object, that it is not necessary to execute collision prevention with the shielded moving object, that it is not necessary to execute collision avoidance with the shielded moving object, or that the shielded moving object is not a collision avoidance object. Note that the shielded moving object is not the collision avoidance object, for example, in a case where a flying object such as a balloon and a bird is detected as the shielded moving object.

Figure 4:
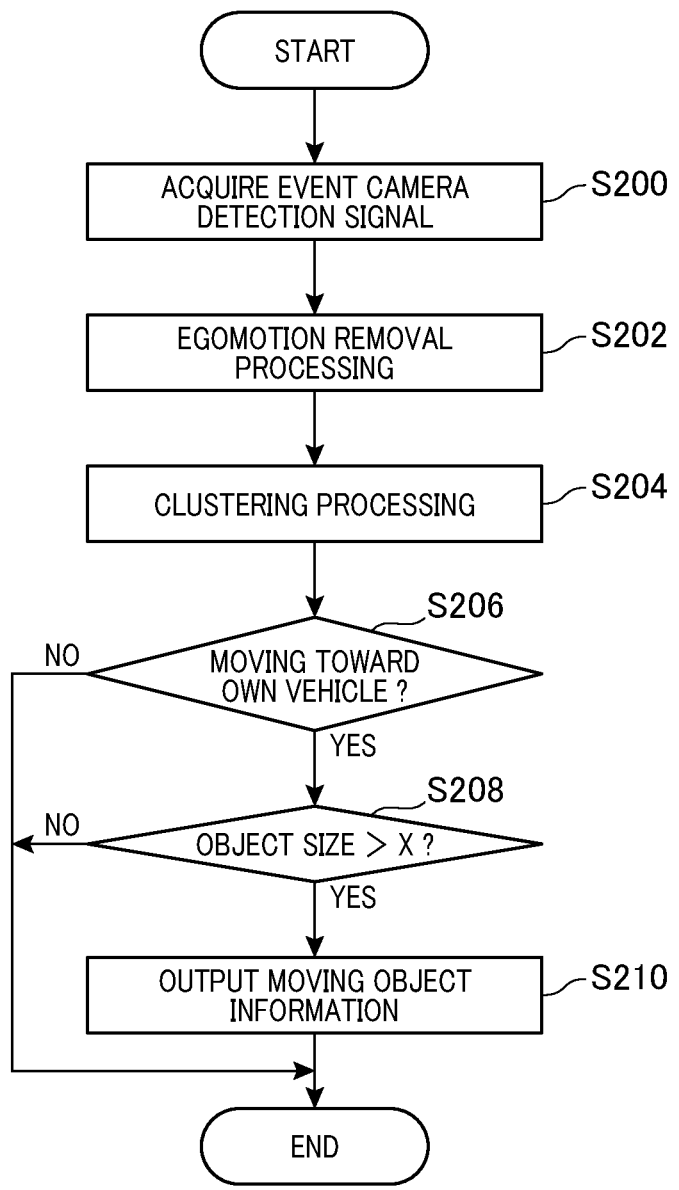
FIG. 4 is a flowchart illustrating a processing flow of moving object detection processing to be executed by the driving support control device according to the first embodiment.

The moving object detection processing to be executed by the driving support control device 100 according to the first embodiment will be described. The processing routine illustrated in FIG. 4 is repeatedly executed at predetermined intervals, for example, at intervals of several microseconds, for example, from when the control system of the vehicle is started until when the control system is stopped or from when the start switch is turned on until when the start switch is turned off. The moving object detection processing illustrated in FIG. 4 is executed by the CPU 101 executing the moving object detection program Pr2. In other words, the driving support processing illustrated in FIG. 3 and the moving object detection processing illustrated in FIG. 4 are executed in parallel, and a detection result of the moving object in the moving object detection processing is utilized in the driving support processing.

The CPU 101 acquires an event camera detection signal (step S200). Specifically, the CPU 101 receives the first detection signal output from the event camera ECU 26 over time and acquires information regarding one or a plurality of changed pixels for which brightness values detected by the event camera 261 are changed. In a case where an object such as a human, a bicycle or a vehicle is being displaced, that is, is moving, information regarding a plurality of changed pixels indicating a contour of the object is included in the first detection signal. The CPU 101 executes egomotion removal processing on the acquired information regarding the changed pixels (step S202). The egomotion means three-dimensional spatial behavior of a measurement system itself, and, in a case of the event camera 261 mounted to the vehicle, means behavior of the vehicle. Egomotion can be obtained by, for example, obtaining motion in a vertical direction and in a horizontal direction of the own vehicle by using vehicle speed acquired by the wheel speed sensor 24 and a yaw rate acquired by the yaw rate sensor 25. The egomotion removal processing is processing for extracting displacement of the object itself by removing changed pixels indicating relative displacement of the object for which brightness values are changed due to behavior of the own vehicle among the detected changed pixels.

Figure 8:
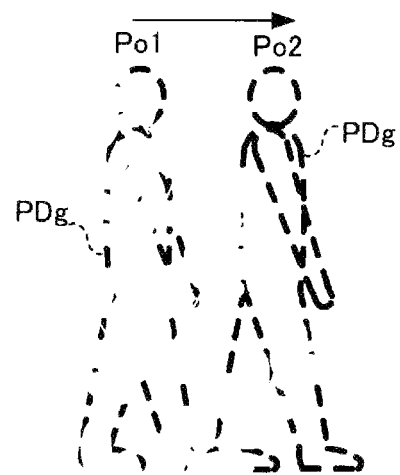
FIG. 8 is an explanatory diagram schematically illustrating a detection result of the obstacle and the moving object illustrated in FIG. 7, detected by an event camera.

The CPU 101 executes clustering processing by using information regarding the changed pixels subjected to the egomotion removal processing (step S204). The clustering processing is processing of extracting one object, that is, a cluster from a plurality of changed pixels and is processing of associating changed pixels which form one object. The clustering processing in the present embodiment is, for example, executed by associating changed pixels, which move in the same direction over time, as changed pixels which form one object. Other than the method described above, the clustering processing may be executed by associating changed pixels for which a distance between pixels is shorter than a distance determined in advance as pixels indicating the same object by using position coordinates of the changed pixels or by associating changed pixels for which brightness values approximate each other as pixels indicating the same object by using the brightness values of the changed pixels. For example, a human object PDg formed by the changed pixels schematically illustrated in FIG. 8 can be obtained through the clustering processing, and matching with a model pattern, which becomes a model for determination, may be performed. Most part of the human hides behind a tree, which is the obstacle OB, at the first position Po1, and thus, the number of changed pixels which constitute the changed pixels is small. At the second position Po2, most part of the human does not hind behind the tree, which is the obstacle OB, and thus, the number of changed pixels which constitute the changed pixels becomes larger, so that it is possible to easily determine that the object is a human. In the clustering processing, (1) in a case where the obstacle is a vehicle, a leg seen from below the vehicle, a body through the glass, or a head protruding from a ceiling of the vehicle can be formed as an object target through clustering, and (2) in a case where the obstacle is a wall, a fence or a barrier, a head protruding over the wall or the fence, or a body seen from a hole portion of the wall or the fence or from voids of the barrier can be formed as an object target through clustering.

The CPU 101 determines whether the extracted object is a moving object which is moving toward the own vehicle M0 (step S206). Specifically, it is determined whether the extracted object is close to, and further comes closer to the own vehicle M0 or in a direction which intersects with the scheduled course of the own vehicle M0 by using change over time of the position coordinates of the changed pixels which form the extracted object. In a case where it is determined that the extracted object is moving toward the own vehicle M0 (step S206: Yes), the CPU 101 determines whether a size of the extracted object is greater than a size X determined in advance (step S208). The size is, for example, a dimension in two-dimensional directions of a vertical direction and a horizontal direction of the object, an area, and a maximum dimension, and the size X determined in advance is a size indicating a size of the collision avoidance object such as a human and a bicycle. The CPU 101 may further calculate an object obtained through the previous clustering, that is, movement predicted coordinates of the position coordinates of the respective changed pixels and may form an object again by executing clustering again by using the position coordinates obtained through movement prediction. In this case, the size of the object can be more appropriately inferred. In a case where it is determined that the size of the extracted object is greater than the size X determined in advance (step S208: Yes), the CPU 101 outputs moving object information indicating that the shielded moving object is detected (step S210) and finishes the present processing routine. As described above, the moving object information is used in the driving support processing illustrated in FIG. 3. In a case where it is determined that the extracted object is not moving toward the own vehicle M0 (step S206: No) or the size of the extracted object is not greater than the size X determined in advance (step S208: No), the CPU 101 finishes the present processing routine.

Execution of the driving support processing will be described using FIG. 5. The CPU 101 acquires collision probability flags F from the collision probability flag storage area 102*a* (step S300). The CPU 101 determines whether the first collision probability flag Fp=1 (step S302), and in a case where the first collision probability flag Fp=1 (step S302: Yes), the CPU 101 determines whether the second collision probability flag Fe=1 (step S304). In a case where the first collision probability flag Fp is not 1 (step S302: No), the CPU 101 finishes the present processing routine. In the driving support processing to be performed for the shielded moving object as illustrated in FIG. 3, after the first collision probability flag Fp is turned on, that is, Fp is set to Fp=1, the second collision probability flag Fe is turned on, and thus, in a case where the first collision probability flag Fp is turned off, that is, Fp=0, normal driving support processing which is to be performed for an object which can be recognized and does not the shielded moving object can be executed instead of driving support processing which is to be performed for the shielded moving object.

In a case where the second collision probability flag Fe is not 1 (step S304: No), the CPU 101 causes the driving support execution device 31 to execute collision prevention support as support for preventing a collision (step S306) and finishes the present processing routine. The collision prevention support, which is preliminary driving support for preventing a collision, is implemented by, for example, arbitrarily combining application of a pressure to the braking line 503 through braking support, notification of a probability of something emerging rapidly from the obstacle OB to the driver, light braking which calls attention to the driver, steering support which encourages change of a traveling lane to a traveling lane which is further from the obstacle, acceleration limitation which disables or restricts accelerator pedal operation, and shape identification processing to be performed while setting the area A1 near the obstacle OB as a target area. The notification includes notification to the driver via speech or display at a dashboard, a head-up display, or the like. As a result of these kinds of collision prevention support being executed, it is possible to reduce speed of the own vehicle M0 or move the own vehicle M0 to a position, that is, a lane further from a collision point CP before the own vehicle M0 reaches the collision point CP with the shielded moving object, and it is possible to improve a probability of the own vehicle M0 stopping at the collision point CP or being deviated from the collision point CP upon execution of collision avoidance support, so that it is possible to prevent or reduce a collision with the shielded moving object.

In a case where the second collision probability flag Fe=1 (step S304: Yes), the CPU 101 causes the driving support execution device 31 to execute collision avoidance support which is similar to normal driving support (step S308) and finishes the present processing routine. It is ideal that the collision avoidance support is executed after the collision prevention support is executed, and, the collision avoidance support is implemented by, for example, arbitrarily combining stopping of the own vehicle M0 at the collision point CP or braking to extremely low speed through braking support, change of a scheduled course to a direction further from the obstacle OB at the collision point CP through steering support, and acceleration limitation which disables accelerator operation. Note that while the processing flow illustrated in FIG. 3 of determining collision prevention support to be performed on the shielded moving object and the processing flow illustrated in FIG. 5 of executing driving support processing in accordance with the determined type of driving support have been described as different kinds of processing routine in the first embodiment to facilitate understanding, it goes without saying that the processing flows illustrated in FIG. 3 and FIG. 5 may be executed as one kind of processing routine of the driving support processing. In this case, the processing in step S110 and step S118 in FIG. 3 is respectively replaced with the processing in step S306 and step S308 in FIG. 5.

According to the driving support control device 100 according to the first embodiment described above, whether the shielded moving object PD, which is shielded by the obstacle OB and which is moving, exists is determined, and in a case where the shielded moving object PD exists, preventive collision prevention support is executed. It is therefore possible to reduce or prevent a collision with the shielded moving object PD which is shielded by the obstacle OB and which is moving. In other words, existence of the shielded moving object PD is predicted, vehicle speed of the own vehicle M0 is reduced before the own vehicle M0 reaches the collision point CP with the shielded moving object PD, and a traveling position of the own vehicle M0 can be moved away from the collision point CP, or the driver is notified of existence of the shielded moving object PD. As a result, it is possible to avoid a collision or reduce damage due to collision of the own vehicle M0 with the shielded moving object PD, which is likely to appear on the scheduled course of the own vehicle M0 from the obstacle OB, regardless of whether collision avoidance operation with respect to the shielded moving object PD is executed through further driving support or by the driver himself/herself.

According to the driving support control device 100 according to the first embodiment, further, in a case where there is a high probability that the shielded moving object PD may appear on the scheduled course of the own vehicle M0 from the obstacle OB and the own vehicle M0 may collide with the shielded moving object PD, collision avoidance support as the driving support is executed. It is therefore possible to further reduce or prevent a collision with the shielded moving object PD, which is shielded by the obstacle OB and which is moving. The collision avoidance support is driving support including stopping of the own vehicle M0 through braking support including execution of emergency braking at the collision point CP and separation of the own vehicle M0 from the collision point CP through steering support including execution of emergency steering avoidance.

Note that in a case where the driving support control device 100 according to the first embodiment determines at least movement of a partially shielded object, which is partially shielded by an obstacle, by using the first detection signal including information indicating displacement of the partially shielded object, the driving support control device 100 is only required to cause the driving support execution device 31 to execute collision prevention support for preventing collision with the partially shielded object, and, for example, it is only necessary to execute at least the processing in steps S102, S104 and S110 in the flowchart illustrated in FIG. 3, the processing in steps S200, S204 and S210 in the flowchart illustrated in FIG. 4, and the processing in step S306 in the flowchart illustrated in FIG. 5.

OTHER EMBODIMENTS (1) Detection of the shielded moving object according to the following aspect may be executed in addition to or in place of detection of the shielded moving object in the above-described embodiments.

The shielded moving object may be detected by utilizing a mirror installed on a road, which is installed at an intersection such as a junction of three roads and a junction of four roads or on a road which has a blind area. For example, in a case where a mirror installed on a road is detected by the camera 221, existence of a shielded moving object which cannot be identified via an obstacle or a shielded moving object which is located at a blind area may be detected by extracting changed pixels and executing clustering on a subject on a mirror surface of the mirror installed on the road, and collision prevention support processing may be executed while setting the first collision probability flag Fp=1. Note that the mirror surface of the mirror installed on the road has a curved surface, and thus, clustering processing is executed on the changed pixels after curvature correction is performed upon clustering. In a case where a mirror installed on a road is used, TTC is calculated using a distance to the mirror installed on the road or a distance to an obstacle which is the closest to the mirror installed on the road.

Further, a shielded moving object may be detected using shadow or illumination light which can be detected behind the obstacle. For example, existence of a shielded moving object which cannot be identified via an obstacle or a shielded moving object which is located in a blind area may be detected by extracting changed pixels and executing clustering on shadow and a headlight of a vehicle, and collision prevention support processing may be executed while setting the first collision probability flag to Fp=1. TTC is calculated using a distance to shadow or illumination light or a distance to an obstacle which is the closest to the shadow or the illumination light.

Further, in a case where a ball is detected as a shielded moving object which appears from a blind area of an obstacle, existence of a shielded moving object, which cannot be identified via an obstacle and which chases after a ball, that is, a child or a shielded moving object which is located in a blind area and which chases after a ball, may be detected, and collision prevention support processing may be executed while setting the first collision probability flag to Fp=1. TTC is calculated using a distance to the ball or a distance to an obstacle which is the closest to the ball.

(2) While in the above-described embodiment, whether to execute the collision prevention support is determined on the basis of whether the object obtained through clustering processing has a size of the shielded moving object for which collision avoidance support is to be performed, whether to execute the collision prevention support processing may be determined using a result of determination through pattern matching as to whether the object obtained through clustering processing is a shielded moving object for which collision avoidance support is to be performed. In this case, a probability of the object being a shielded moving object becomes higher, so that it is possible to improve execution accuracy of the collision prevention support processing, that is, cause preventive driving support processing to be executed in a case where the processing should be executed.

(3) While in the above-described embodiments, the control unit which executes the driving support processing and the moving object detection processing is implemented with software by the CPU 101 executing the driving support program Pr1 and the moving object detection program Pr2, the control unit may be implemented with hardware using an integrated circuit or a discrete circuit which is programmed in advance. In other words, the control unit and the method thereof in the above-described embodiments may be implemented with a dedicated computer constituted with a processor and a memory which are programmed so as to execute one or a plurality of functions embodied by a computer program. Alternatively, the control unit and the method thereof described in the present disclosure may be implemented with a dedicated computer obtained by constituting a processor with one or more dedicated hardware logic circuits. Alternatively, the control unit and the method thereof described in the present disclosure may be implemented with one or more dedicated computers constituted with a combination of a processor and a memory programmed to execute one or a plurality of functions and a processor constituted with one or more hardware logic circuits. Further, the computer program may be stored in a computer-readable non-transitory tangible storage medium as an instruction to be executed by the computer.

While the present disclosure has been described above on the basis of the embodiments and the modified examples, the embodiments described above are provided to facilitate understanding of the present disclosure and do not limit the present disclosure. The present disclosure can be changed and modified without deviating from the gist and the scope of the claims and incorporates the equivalents thereof. For example, technical features in the embodiments and the modified examples can be replaced or combined as appropriate to solve part or all of the above-described problems or to achieve part or all of the above-described effects. Further, the technical features which are not described as essential features in the present specification can be deleted as appropriate.

A first aspect of the present disclosure provides a driving support control device (100) for a vehicle (500). The device includes: an acquisition unit (103) configured to acquire, from a first detector (26, 261) which detects change of a brightness value of an object which occurs in accordance with displacement of the object, information indicating change of a brightness value of a partially shielded object partially shielded by an obstacle which occurs in accordance with displacement of the partially shielded object, as a first detection signal; and a control unit (101, Pr1) configured to, in a case where it is determined, by using the first detection signal, that the partially shielded object is moving, cause a driving support execution device (31) to execute collision prevention support for preventing a collision with the partially shielded object.

According to the driving support control device for the vehicle according to the first aspect, it is possible to reduce a collision or prevent a collision with the partially shielded object which is partially shielded by the obstacle and which is moving.

A second aspect of the present disclosure provides a driving support method for a vehicle (500). The method includes: acquiring, from a first detector which detects change of a brightness value of an object which occurs in accordance with displacement of the object, information indicating change of a brightness value of a partially shielded object partially shielded by an obstacle which occurs in accordance with displacement of the partially shielded object, as a first detection signal; and in a case where it is determined, by using the first detection signal, that the partially shielded object is moving, causing a driving support execution device (31) to execute collision prevention support for preventing a collision with the partially shielded object.

According to the driving support method for the vehicle according to the second aspect, it is possible to reduce a collision or prevent a collision with the partially shielded object which is partially shielded by the obstacle and which is moving. Note that the present disclosure can be also implemented as a driving support program for a vehicle or a computer-readable recording medium in which the program is stored.

What is claimed is:

1. A driving support control device for a vehicle, comprising:
    an acquisition unit configured to acquire, from a first detector which detects change of a brightness value of an object which occurs in accordance with displacement of the object, information indicating change of a brightness value of a partially shielded object partially shielded by an obstacle which occurs in accordance with displacement of the partially shielded object, as a first detection signal; and
    a control unit configured to, in a case where it is determined, by using the first detection signal, that the partially shielded object is moving, cause a driving support execution device to execute collision prevention support for preventing a collision with the partially shielded object.

2. The driving support control device according to claim 1, wherein
    the first detection signal is information regarding changed pixels, which is output from a first detector having a plurality of pixels and for which values are changed in accordance with displacement of an object, and
    the control unit determines whether the partially shielded object is moving by using the information regarding the changed pixels.

3. The driving support control device according to claim 2, wherein
    the control unit executes clustering processing on the changed pixels by using the information regarding the changed pixels, and in a case where a cluster which is close to an own vehicle or a scheduled course of the own vehicle is detected, determines whether the partially shielded object is moving.

4. The driving support control device according to claim 2, wherein
    the control unit executes clustering processing on the changed pixels by using the information regarding the changed pixels and, in a case where a cluster which comes close to an own vehicle or a scheduled course of the own vehicle is detected, determines whether the shielded moving object exists.

5. The driving support control device according to claim 1, wherein
    the collision prevention support includes at least one of preliminary braking support at the vehicle, preliminary steering support at the vehicle, acceleration limitation of the own vehicle, and notification of existence of the partially shielded object to a driver.

6. The driving support control device according to claim 1, wherein
    the acquisition unit further acquires information regarding an object around the own vehicle as a second detection signal, and
    in a case where an object is detected near the obstacle by using the second detection signal, the control unit further causes the driving support execution device to execute collision avoidance support which has a higher support level than a support level of the collision prevention support.

7. The driving support control device according to claim 6, wherein,
    the second detection signal is output in accordance with detection of at least part of the partially shielded object which appears from a blind area of the obstacle and becomes a non-shielded object, and
    the control unit further causes the driving support execution device to execute the collision avoidance support on the object by using the first detection signal.

8. The driving support control device according to claim 6, wherein
    the collision avoidance support includes at least one of braking support to be performed while the obstacle is set as an operation target, steering support to be performed while the obstacle is set as an operation target, braking support to be performed while the object is set as an operation target, steering support to be performed while the object is set as an operation target, and acceleration limitation of the own vehicle.

9. The driving support control device according to claim 6, wherein
    the control unit executes the collision avoidance support while setting an area, in which it is determined that the partially shielded object is moving, near the obstacle, as a target area.

10. The driving support control device according to claim 6, wherein
    in a case where it is determined that the partially shielded object is moving, the control unit increases an execution frequency of detection processing of an object using the second detection signal.

11. A driving support system to be mounted to a vehicle, the driving support system comprising:

the driving support control device according to claim 1;

a first detector having a plurality of pixels and configured to output the first detection signal; and the driving support execution device.

12. A driving support system to be mounted to a vehicle, the driving support system comprising:

the driving support control device according to claim 6;

a first detector having a plurality of pixels and configured to output the first detection signal;

a second detector configured to output the second detection signal; and the driving support execution device.

13. A driving support method for a vehicle, comprising:

acquiring, from a first detector which detects change of a brightness value of an object which occurs in accordance with displacement of the object, information indicating change of a brightness value of a partially shielded object partially shielded by an obstacle which occurs in accordance with displacement of the partially shielded object, as a first detection signal; and in a case where it is determined, by using the first detection signal, that the partially shielded object is moving, causing a driving support execution device to execute collision prevention support for preventing a collision with the partially shielded object.

* * * * *